(12) United States Patent
Sharpe et al.

(10) Patent No.: US 11,966,449 B2
(45) Date of Patent: Apr. 23, 2024

(54) SYSTEMS AND METHODS FOR GENERATING CUSTOM CONTENT

(71) Applicant: Capital One Services, LLC, McLean, VA (US)

(72) Inventors: Samuel Sharpe, Cambridge, MA (US); Grant Eden, Menlo Park, CA (US); Galen Rafferty, Mahomet, IL (US); Anh Truong, Champaign, IL (US); Jeremy Edward Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/896,689

(22) Filed: Aug. 26, 2022

(65) Prior Publication Data

US 2024/0070219 A1    Feb. 29, 2024

(51) Int. Cl.
*G06F 16/957* (2019.01)
*G06F 16/958* (2019.01)
*H04L 67/50* (2022.01)

(52) U.S. Cl.
CPC ........ *G06F 16/9577* (2019.01); *G06F 16/958* (2019.01); *H04L 67/535* (2022.05)

(58) Field of Classification Search
CPC ... G06F 16/9577; G06F 16/958; H04L 67/535
USPC ........................................................ 715/234
See application file for complete search history.

(56) References Cited

U.S. PATENT DOCUMENTS

| | | | |
|---|---|---|---|
| 9,854,064 B2 | 12/2017 | Ellen et al. | |
| 10,282,357 B1* | 5/2019 | Halpin, Jr. | G06F 16/2379 |
| 10,558,657 B1* | 2/2020 | Cheng | G06F 16/93 |
| 10,599,557 B2 | 3/2020 | Sahni et al. | |
| 10,706,120 B1* | 7/2020 | Rachmeler | G06F 16/958 |
| 10,733,078 B2 | 8/2020 | Mordo et al. | |
| 10,783,429 B2 | 9/2020 | Miikkulainen et al. | |
| 10,891,351 B2 | 1/2021 | Pham | |
| 11,314,836 B1* | 4/2022 | Kent | G06F 16/9577 |
| 11,435,873 B1* | 9/2022 | Sharma | G06F 16/9538 |
| 2019/0325084 A1* | 10/2019 | Peng | G10L 15/183 |
| 2020/0081911 A1* | 3/2020 | Vallabhajosyula | G06N 20/00 |
| 2020/0175088 A1* | 6/2020 | Pham | G06F 16/957 |

(Continued)

*Primary Examiner* — William D Titcomb
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a system for generating custom content. The system may generate a first webpage comprising first feature(s). The system may transmit the first webpage for display via a graphical user interface (GUI) of a user device. The system may iteratively, until a predetermined threshold is achieved: receive data corresponding to a first user; generate, by an encoder, encoded data based on the data; generate, by a decoder, second feature(s) based on the encoded data; modify the first webpage to generate a second webpage comprising the second feature(s); transmit the second webpage for display via the GUI of the user device; receive user feedback associated with the second webpage; and determine whether the user feedback exceeds the predetermined threshold. Responsive to the predetermined threshold being achieved, the system may transmit the latest version of the second webpage without requesting additional user feedback.

20 Claims, 4 Drawing Sheets

(56) References Cited

U.S. PATENT DOCUMENTS

| | | | |
|---|---|---|---|
| 2020/0244622 A1* | 7/2020 | Lai | G06F 18/214 |
| 2021/0117484 A1* | 4/2021 | Sollami | G06F 40/216 |
| 2021/0174329 A1* | 6/2021 | Kursun | G06Q 20/223 |
| 2021/0342930 A1* | 11/2021 | Shenk | H04L 65/403 |
| 2021/0357591 A1* | 11/2021 | Campos Ortega | G06F 40/30 |
| 2022/0188698 A1* | 6/2022 | Halecky | G06N 5/04 |
| 2022/0198288 A1* | 6/2022 | Buchanan | G06N 5/022 |
| 2022/0224763 A1* | 7/2022 | Tadesse | H04L 65/762 |
| 2022/0231911 A1* | 7/2022 | Anand | H04L 67/535 |
| 2023/0004832 A1* | 1/2023 | Sahasi | G06Q 30/0201 |
| 2023/0005382 A1* | 1/2023 | Loh | G09B 5/12 |
| 2023/0087738 A1* | 3/2023 | Samala | G06F 16/958 707/730 |

\* cited by examiner

SYSTEMS AND METHODS FOR GENERATING CUSTOM CONTENT

The disclosed technology relates to systems and methods for generating custom content. Specifically, this disclosed technology relates to iterative generation of custom content based on user-specific data.

BACKGROUND

Typically, when users visit websites, those websites are not tailored toward specific users, but apply generally to all users. That is, any user that arrives on a webpage may see the same layout, design, features, formatting, etc. Other websites may utilize certain elements of customization, such as providing two different versions of the website to determine which version appears to have more of an impact on user activity via that website. These customizations, however, tend to be limited in the number of variations users may see when they visit certain webpages.

Accordingly, there is a need for improved systems and methods for generating custom content. Embodiments of the present disclosure are directed to this and other considerations.

SUMMARY

Disclosed embodiments may include a system for generating custom content. The system may include one or more processors, and memory in communication with the one or more processors and storing instructions that, when executed by the one or more processors, are configured to cause the system to generate custom content. The system may generate a first webpage comprising one or more first features. The system may transmit the first webpage for display via a graphical user interface (GUI) of a user device. The system may iteratively, until a predetermined threshold is achieved: receive data corresponding to a first user; generate, by an encoder, encoded data based on the data; generate, by a decoder, one or more second features based on the encoded data; modify the first webpage to generate a second webpage comprising the one or more second features; transmit the second webpage for display via the GUI of the user device; receive user feedback associated with the second webpage; and determine whether the user feedback exceeds the predetermined threshold. Responsive to the predetermined threshold being achieved, the system may transmit the latest version of the second webpage without requesting additional user feedback.

Disclosed embodiments may include a system for generating custom content. The system may include one or more processors, and memory in communication with the one or more processors and storing instructions that, when executed by the one or more processors, are configured to cause the system to generate custom content. The system may generate a first webpage comprising one or more first features. The system may transmit the first webpage for display via a GUI of a user device. The system may receive data corresponding to a first user. The system may generate, by an encoder, encoded data based on the data. The system may generate, by a decoder, one or more second features based on the encoded data. The system may modify the first webpage to generate a second webpage comprising the one or more second features. The system may transmit the second webpage for display via the GUI of the user device.

Disclosed embodiments may include a system for generating custom content. The system may include one or more processors, and memory in communication with the one or more processors and storing instructions that, when executed by the one or more processors, are configured to cause the system to generate custom content. The system may iteratively, until a predetermined threshold is achieved: select first content; transmit the first content for display via a GUI of a user device; receive data corresponding to a first user; generate, by an encoder, encoded data based on the data; generate, by a decoder, second content based on the encoded data; transmit the second content for display via the GUI of the user device; receive user feedback associated with the second content; select third content based on the user feedback; and determine whether selecting the third content satisfies the predetermined threshold. Responsive to determining that selecting the third content satisfies the predetermined threshold, the system may maintain the third content for display via the GUI of the user device.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
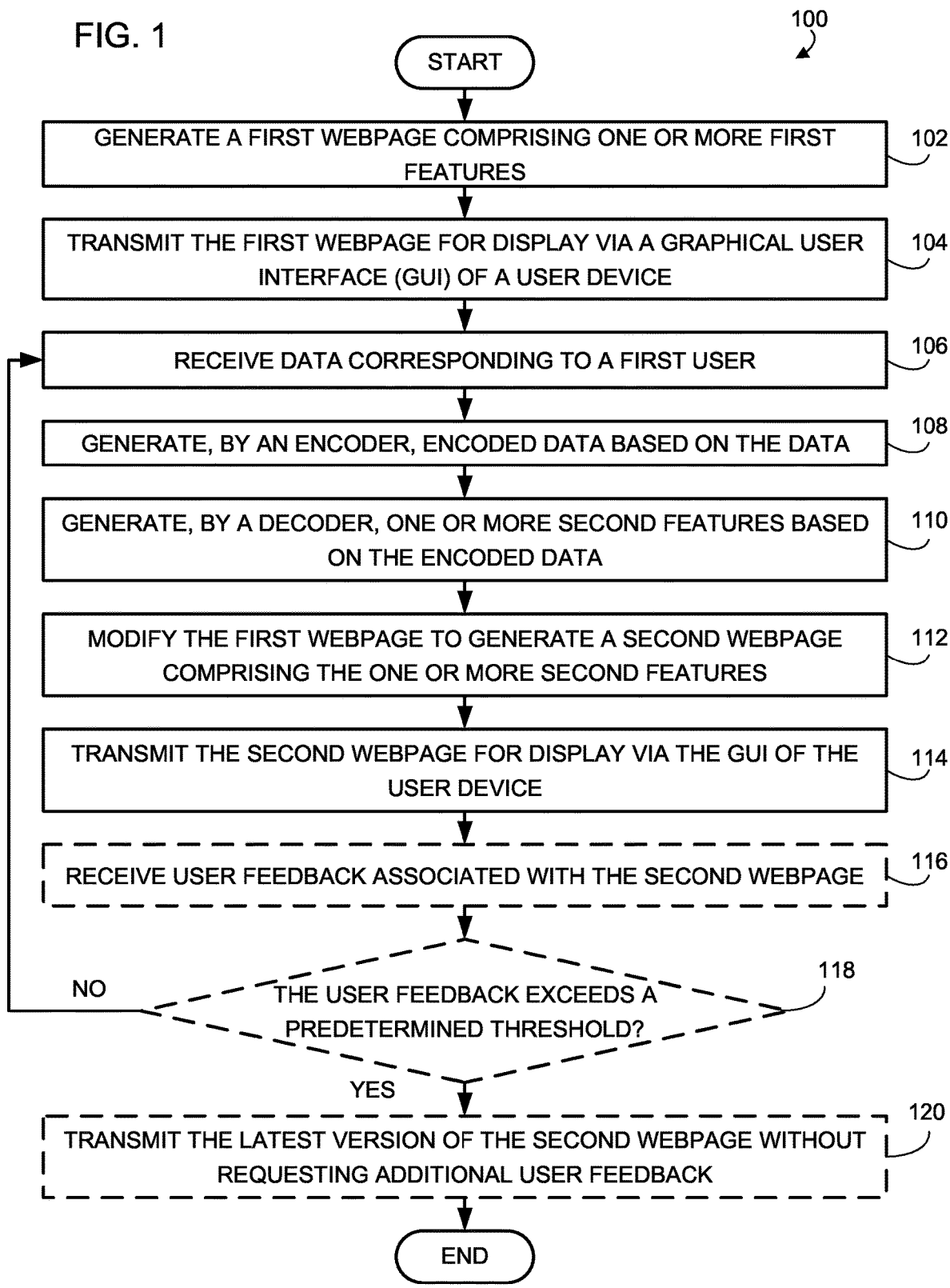
FIG. 1 is a flow diagram illustrating an exemplary method for generating custom content in accordance with certain embodiments of the disclosed technology.

Traditional systems and methods for generating custom content typically provide a fixed number of manually-curated options that can be targeted toward a specific group of people, such as through webpage design. For example, A/B or multivariate testing are traditional techniques for gauging the impact of certain features or variables on sets of users. These techniques, however, are typically limited by a fixed number of testing variables, as well as a fixed grouping of users on which to test the variables.

Accordingly, the systems and methods disclosed herein may provide for iteratively generating custom content based on the integration of user-specific data with previously curated content such that a webpage may be optimized or tailored toward each specific user. The systems and methods disclosed herein may provide for receiving user-specific data, encoding that data (e.g., via a neural network) such that the data resides in latent space, and decoding the latent space data to generate new content to display to a user. Each time new content is displayed to a user, the systems and methods disclosed herein may provide for the receiving of user feedback such that the content may be even further enhanced or optimized for the specific user.

The systems and methods described herein utilize, in some instances, machine learning models (MLMs), which are necessarily rooted in computers and technology. Machine learning models are a unique computer technology that involves training models to complete tasks and make decisions. As discussed herein, this, in some examples, may involve encoding user-specific input data (e.g., webpage activity, account information, etc.), decoding the data to generate new content, and using a multi-armed bandit to select a combination of old and/or new content to display to a user. Using machine learning in this way may allow the system to iteratively generate custom content and to predict when the custom content may be most impactful on an end user. This is a clear advantage and improvement over prior technologies that provide a fixed amount of variable content. The present disclosure solves this problem by providing an infinite amount of variables to test on human interaction and effectiveness. Furthermore, examples of the present disclosure may also improve the speed with which computers can generate custom user content. Overall, the systems and methods disclosed have significant practical applications in the content generation field because of the noteworthy improvements of the ability to iteratively generate and predict effectiveness of custom user content, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for generating custom content, in accordance with certain embodiments of the disclosed technology. The steps of method 100 may be performed by one or more components of the system 400 (e.g., content generation system 320 or web server 408 of content customization system 406 or user device 402), as described in more detail with respect to FIGS. 3 and 4.

In block 102, the content generation system 320 may generate a first webpage comprising one or more first features. The features may include text, images, videos, various layouts, fonts, headers, footers, colors, shapes, and the like. For example, the system may be configured to generate the first webpage including curated or generic features that may not apply to any specific user. In some embodiments, however, the first features may be selected to target a certain audience or group of users, such as based on age range, line of business, certain recreational activity interest, etc.

In block 104, the content generation system 320 may transmit the first webpage for display via a graphical user interface (GUI) of a user device (e.g., user device 402). For example, the system may be configured to generate the first webpage, and transmit the first webpage for display to a user or grouping of users as a starting point upon which to then tailor the webpage content to specific users, as further discussed below.

In block 106, the content generation system 320 may receive data corresponding to a first user. The data may include webpage activity, account information, profile information, and the like. In some embodiments, the system may receive the data through an account or profile associated with the user, for example, if the user is a customer of an organization owning and/or operating content generation system 320. In some embodiments, the system may receive the data through the operation of a browser plugin or other type of application wherein the user may input various pieces of information, and/or the browser plugin or application may be configured to automatically retrieve certain pieces of data, such as the user's webpage activity (e.g., click data, cookies, etc.). A benefit of this step is that the system may be configured to enhance the first webpage and/or the first features of the first webpage, as discussed above with respect to blocks 102 and 104, based on the user's specific information, as further discussed below.

In block 108, the content generation system 320 may generate, by an encoder, encoded data based on the data. In some embodiments, the encoder may include a neural network configured to compress the received user data and insert it into latent space. In some embodiments, the latent data may include previously compressed and inserted data corresponding to other users who may be associated with the first user in some way, such as in a similar age group, profession, etc. The encoding of the first user's data and the insertion of it into this type of compiled latent space may allow the system to make more informed predictions as to what types of new data, content, or features may impact the first user, as further discussed below.

In block 110, the content generation system 320 may generate, by a decoder, one or more second features based on the encoded data. In some embodiments, the one or more second features may be the same or similar to the one or more first features, as discussed above in block 102; however, the second features may include enhanced, optimized, or new features or content based on the latent space. For example, if a first feature included on the first webpage was displayed in a first format, such as a selectable button displayed in red, the system may be configured to predict, based on the compiled user data contained within the latent space, that the first user may respond better to the selectable button being displayed in blue.

In some embodiments, generating the second features may include sampling the data contained or embedded within the latent space according to a posterior distribution, followed by passing the data through a generative decoder. In some embodiments, the decoder may include an MLM, such as a Generative Adversarial Network (GAN), a Generative Pre-trained Transformer 3 (GPT-3), a Multilayer perceptron (MLP), and the like. A GAN may be utilized, for example, to decode image data. A GPT-3 may be utilized, for example, to decode text data. Other types of models, such as positional encoding embeddings or a pointer network, may be used, for example, to decode additional types of layouts or formatting features.

In block 112, the content generation system 320 may modify the first webpage to generate a second webpage comprising the one or more second features. For example, the system may be configured to re-format, move around, or otherwise change any of the first features contained on the first webpage to the generated second features.

In block 114, the content generation system 320 may transmit the second webpage for display via the GUI of the user device. For example, the system may transmit the modified or updated second webpage containing the second features such that the first user can now view and interact with the second webpage that is more tailored toward the first user.

In optional block 116, the content generation system 320 may receive user feedback associated with the second webpage. In some embodiments, the user feedback may include click data, a selection of a user input object, a response to a prompt, a survey, and the like. For example, the system may be configured to monitor the first user's activity and interactions with the second webpage to then later use that feedback to determine how well the encoder and/or decoder performed in terms of generating the second features, as further discussed below.

In optional block 118, the content generation system 320 may determine whether the user feedback exceeds a predetermined threshold. In some embodiments, the predetermined threshold may correspond to user response rates, for example, an overall rate of user activity on a webpage within a given time period, a rate of cursor movement on the webpage, a rate at which a user interacts with certain interactive objects on the webpage (e.g., click buttons, dropdown menu selectors, video players, etc.), and the like. In some embodiments, the predetermined thresholds may correspond to a measure of certain predefined significance (e.g., 95 percent), that may be achieved based on a specific sample size by using, for example, Welch's t-test, Student's t-test, Fisher's exact test, Bernard's test, E-test, C-test, Chi-squared test, Z-tests, Mann-Whitney U Test, Gibbs sampling, and the like. In some embodiments, the predetermined thresholds may be based on a certain level (e.g., a majority) of traffic pushed towards the second webpage.

In optional block 120, responsive to the user feedback exceeding the predetermined threshold, the content generation system 320 may transmit the latest version of the second webpage without requesting additional user feedback. For example, responsive to the user feedback exceeding the predetermined threshold, the system may be configured to determine that whichever version of the webpage was most recently transmitted for display to the user, that version is likely optimized sufficiently for the first user and thus no longer requires the collection of additional user feedback. A benefit of this type of iterative content or webpage generation system is that the final version of the displayed webpage may be most optimized for each respective user.

In some embodiments, responsive to the user feedback not exceeding the predetermined threshold, the content generation system 320 may be configured to restart the process of receiving user data (block 106), generating encoded data (block 108), generating second feature(s) (block 110), modifying the second webpage to generate a third webpage including the second feature(s) (block 112), and transmitting the third webpage for display via the GUI of the user device (block 114). A benefit of this iterative process is that the system may be configured to conduct one or more of the above steps an infinite number of times until the system understands (e.g., by determining the user feedback exceeds the predetermined threshold) that the currently displayed feature(s) of the currently displayed webpage are fully customized or tailored to a specific user.

Figure 2:
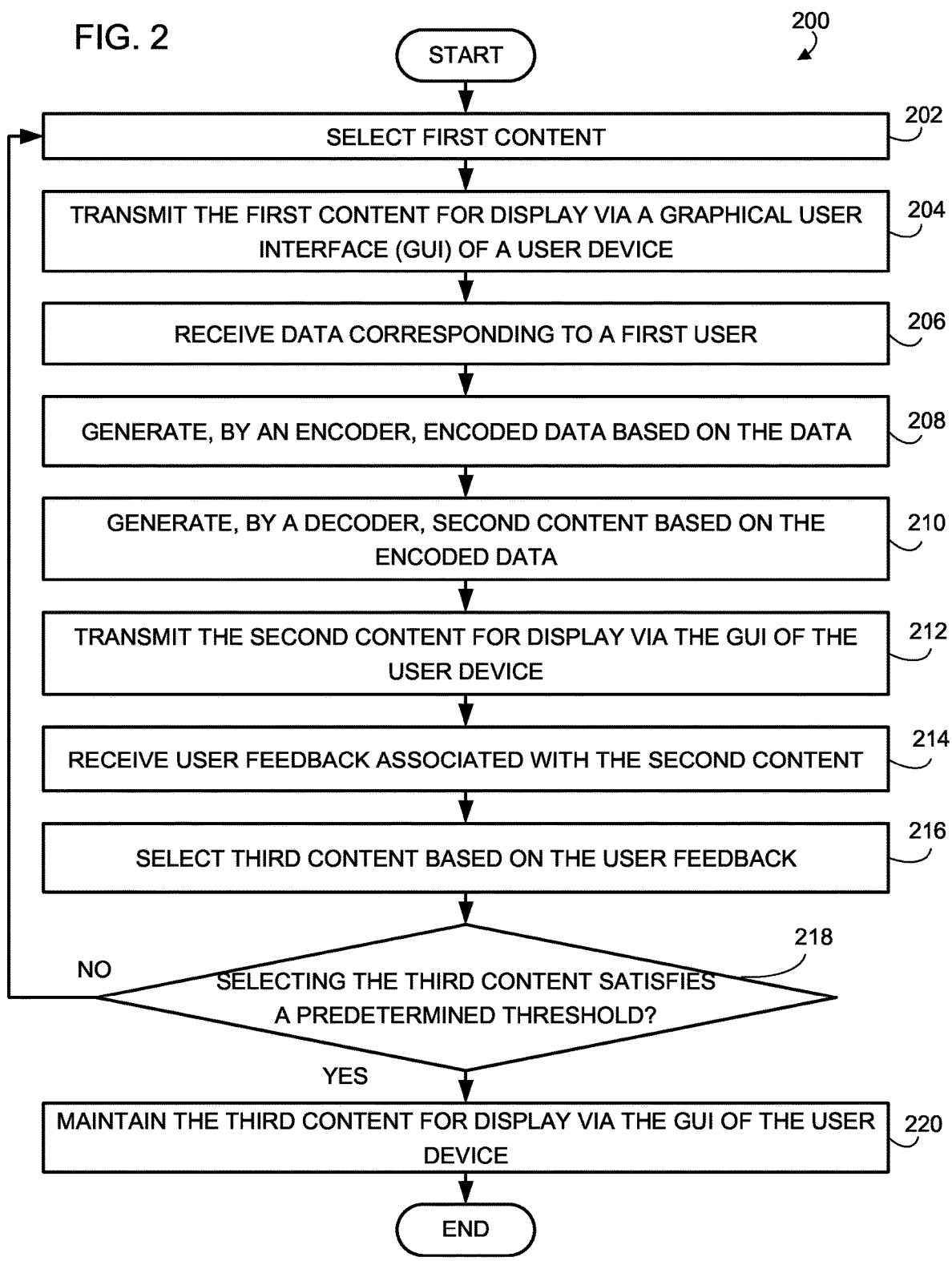
FIG. 2 is a flow diagram illustrating an exemplary method for generating custom content in accordance with certain embodiments of the disclosed technology.

FIG. 2 is a flow diagram illustrating an exemplary method 200 for generating custom content, in accordance with certain embodiments of the disclosed technology. The steps of method 200 may be performed by one or more components of the system 400 (e.g., content generation system 320 or web server 408 of content customization system 406 or user device 402), as described in more detail with respect to FIGS. 3 and 4.

Method 200 of FIG. 2 is similar to method 100 of FIG. 1, except that method 200 may include determining whether the selecting of certain content satisfies a predetermined threshold, rather than determining whether user feedback exceeds a predetermined threshold. The descriptions of blocks 206, 208, and 214 in method 200 may be the same as or similar to the respective descriptions of blocks 106, 108, and 116 of method 100 and are not repeated herein for brevity. However, blocks 202, 204, 210, and 212 are different from respective blocks 102, 104, 110, and 114 and are described below. Additional blocks 216, 218, and 220 are also described below.

In block 202, the content generation system 320 may select first content. In some embodiments, first content may be the same as or similar to the first features, as discussed above in block 102. In some embodiments, first content may include features or variables that are not newly generated, but are taken from a grouping of previously generated and/or displayed features or variables.

In block 204, the content generation system 320 may transmit the first content for display via a GUI of a user device. In some embodiments, this step may be the same as or similar to block 104. In some embodiments, the system may be configured to transmit the first content for display via a webpage already configured or on display to a user.

In block 210, the content generation system 320 may generate, by a decoder, second content based on the encoded data. In some embodiments, this step may be the same as or similar to block 110. In some embodiments, the system may be configured to generate net-new features or variables that were not included in the first content. For example, upon evaluating the user data contained within the latent space, as discussed above, the system may be configured to determine that a specific user may respond well to visualizing a webpage in a certain new format. The system may be configured to generate a new format or features displayed in certain new formats to obtain a greater or more positive response from the user.

In block 212, the content generation system 320 may transmit the second content for display via the GUI of the user device. This step may be the same as or similar to block 204, as discussed above.

In block 216, the content generation system 320 may select third content based on the user feedback. In some embodiments, the selection may be conducted via a multi-armed bandit configured to determine, based on the user feedback, whether additional new content should be generated, or if the user is responsive enough to previously generated (e.g., older) content, that generating additional new content may not be necessary. In some embodiments, whenever the multi-armed bandit selects either old or new content as the third content, the associated encoder and/or decoder, as discussed above, may be updated, e.g., via a Bayesian optimization, to learn how to more accurately generate new custom content targeted toward a specific user based on user data and their feedback.

In block 218, the content generation system 320 may determine whether selecting the third content satisfies a predetermined threshold. In some embodiments, the predetermined threshold may include a percentage of time that the multi-armed bandit selects old versus new content. For example, if the system determines that the multi-armed bandit reaches a point where it is selecting old content at least 90 percent of the time, this may indicate that the system has been optimized to the point where the system no longer needs to continue generating new content for a specific user as frequently. This may indicate that the system has been optimized to where the content currently selected for and displayed to the first user may be sufficiently customized for the first user. A benefit of this feature may be that owners and/or operators of webpages, e.g., webpage designers, may benefit from the generation of new webpages by being able to evaluate, based on user interactions with the webpages, common generated features across users who perform well such that the designers can use and hard-code those features.

In block 220, responsive to determining that selecting the third content satisfies the predetermined threshold, the content generation system 320 may maintain the third content for display via the GUI of the user device. For example, as discussed above, upon determining that the multi-armed bandit is selecting old or previously-generated content—as opposed to continuing to select newly generated content—at least a certain percentage of time, the system may be configured to maintain the most recently selected content for display to the user.

In some embodiments, responsive to determining that selecting the third content does not satisfy the predetermined threshold, the content generation system 320 may be configured to restart the process of selecting content (block 202), transmitting the content for display via the GUI (block 204), receiving user data (block 206), generating encoded data (block 208), generating new content (block 210), transmitting the new content for display via the GUI (block 212), receiving user feedback (block 214), and selecting content (either old or new) based on the user feedback (216). A benefit of this iterative process is that the system may be configured to conduct one or more of the above steps an infinite number of times until the system understands (e.g., by determining that the multi-armed bandit has begun selecting old content at least a certain percentage of the time) that the content currently displayed to the user via the GUI is fully customized or tailored to that specific user.

Figure 3:
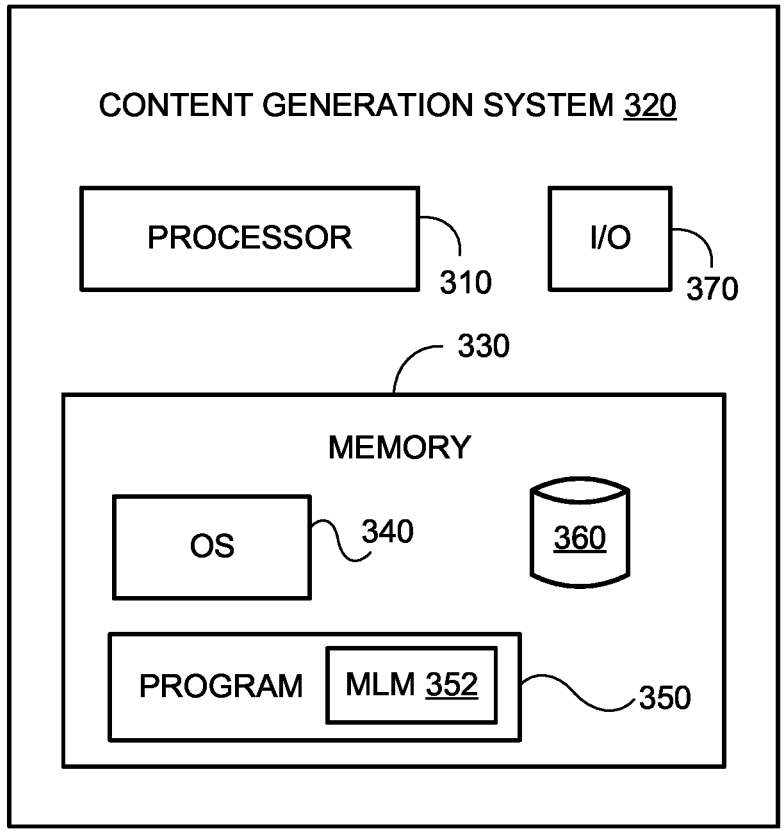
FIG. 3 is block diagram of an example content generation system used to generate custom content, according to an example implementation of the disclosed technology.
Figure 4:
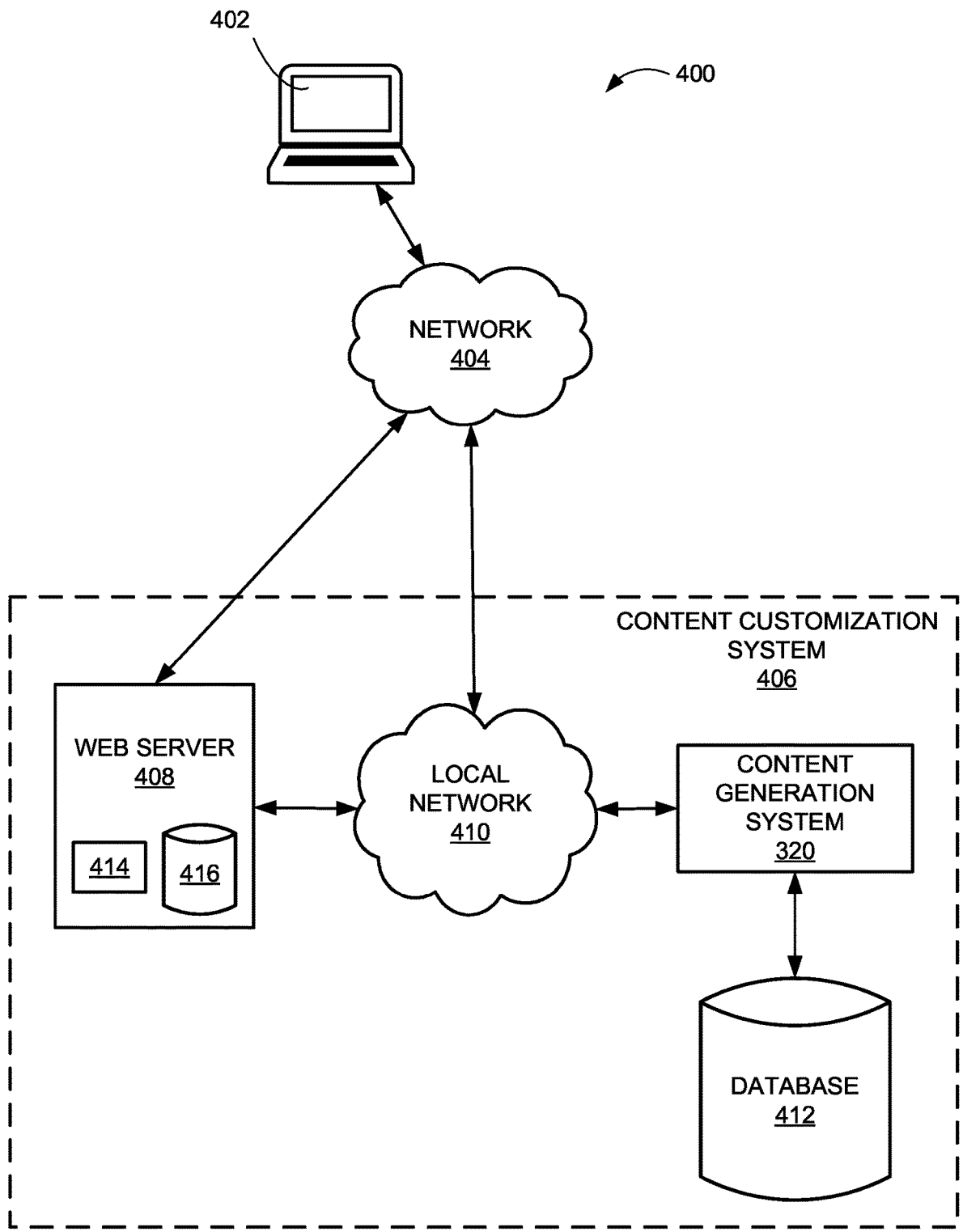
FIG. 4 is block diagram of an example system that may be used to generate custom content, according to an example implementation of the disclosed technology.

FIG. 3 is a block diagram of an example content generation system 320 used to generate custom content according to an example implementation of the disclosed technology. According to some embodiments, the user device 402 and web server 408, as depicted in FIG. 4 and described below, may have a similar structure and components that are similar to those described with respect to content generation system 320 shown in FIG. 3. As shown, the content generation system 320 may include a processor 310, an input/output (I/O) device 370, a memory 330 containing an operating system (OS) 340 and a program 350. In some embodiments, program 350 may include an MLM 352 that may be trained, for example, to encode user data, decode user data, and/or select what type(s) of content should be displayed to achieve optimal impact on a user. In certain implementations, MLM 352 may issue commands in response to processing an event, in accordance with a model that may be continuously or intermittently updated. Moreover, processor 310 may execute one or more programs (such as via a rules-based platform or the trained MLM 352), that, when executed, perform functions related to disclosed embodiments.

In certain example implementations, the content generation system 320 may be a single server or may be configured as a distributed computer system including multiple servers or computers that interoperate to perform one or more of the processes and functionalities associated with the disclosed embodiments. In some embodiments content generation system 320 may be one or more servers from a serverless or scaling server system. In some embodiments, the content generation system 320 may further include a peripheral interface, a transceiver, a mobile network interface in communication with the processor 310, a bus configured to facilitate communication between the various components of the content generation system 320, and a power source configured to power one or more components of the content generation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™ low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the content generation system 320 may include one or more storage devices configured to store information used by the processor 310 (or other components) to perform certain functions related to the disclosed embodiments. In one example, the content generation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The content generation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the content generation system 320 may include the memory 330 that may include one or more programs 350 to perform one or more functions of the disclosed embodiments. For example, in some embodiments, the content generation system 320 may additionally manage dialogue and/or other interactions with the customer via a program 350.

The processor 310 may execute one or more programs 350 located remotely from the content generation system 320. For example, the content generation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a content generation system database 360 for storing related data to enable the content generation system 320 to perform one or more of the processes and functionalities associated with the disclosed embodiments.

The content generation system database 360 may include stored data relating to status data (e.g., average session duration data, location data, idle time between sessions, and/or average idle time between sessions) and historical status data. According to some embodiments, the functions provided by the content generation system database 360 may also be provided by a database that is external to the content generation system 320, such as the database 412 as shown in FIG. 4.

The content generation system 320 may also be communicatively connected to one or more memory devices (e.g., databases) locally or through a network. The remote memory devices may be configured to store information and may be accessed and/or managed by the content generation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The content generation system 320 may also include one or more I/O devices 370 that may comprise one or more interfaces for receiving signals or input from devices and providing signals or output to one or more devices that allow data to be received and/or transmitted by the content generation system 320. For example, the content generation system 320 may include interface components, which may provide interfaces to one or more input devices, such as one or more keyboards, mouse devices, touch screens, track pads, trackballs, scroll wheels, digital cameras, microphones, sensors, and the like, that enable the content generation system 320 to receive data from a user (such as, for example, via the user device 402).

In examples of the disclosed technology, the content generation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The content generation system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another MLM. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The content generation system 320 may be configured to adjust model parameters during training. Model parameters may include weights, coefficients, offsets, or the like. Training may be supervised or unsupervised.

The content generation system 320 may be configured to train MLMs by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The content generation system 320 may be configured to optimize statistical models using known optimization techniques.

Furthermore, the content generation system 320 may include programs configured to retrieve, store, and/or analyze properties of data models and datasets. For example, content generation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The content generation system 320 may include algorithms to determine a data type, key-value pairs, row-column data structure, statistical distributions of information such as keys or values, or other property of a data schema may be configured to return a statistical profile of a dataset (e.g., using a data-profiling model). The content generation system 320 may be configured to implement univariate and multivariate statistical methods. The content generation system 320 may include a regression model, a Bayesian model, a statistical model, a linear discriminant analysis model, or other classification model configured to determine one or more descriptive metrics of a dataset. For example, content generation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The content generation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, content generation system 320 may be configured to generate a similarity metric representing a measure of similarity between data in a dataset. A similarity metric may be based on a correlation, covariance matrix, a variance, a frequency of overlapping values, or other measure of statistical similarity.

The content generation system 320 may be configured to generate a similarity metric based on data model output, including data model output representing a property of the data model. For example, content generation system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The content generation system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The content generation system 320 may include one or more data classification models to classify datasets based on the data schema, statistical profile, and/or edges. A data classification model may include a convolutional neural network, a random forest model, a recurrent neural network model, a support vector machine model, or another MLM. A data classification model may be configured to classify data elements as actual data, synthetic data, related data, or any other data category. In some embodiments, content generation system 320 is configured to generate and/or train a classification model to classify a dataset, consistent with disclosed embodiments.

The content generation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the content generation system may analyze information applying machine-learning methods.

While the content generation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the content generation system 320 may include a greater or lesser number of components than those illustrated.

FIG. 4 is a block diagram of an example system that may be used to view and interact with content customization system 408, according to an example implementation of the disclosed technology. The components and arrangements shown in FIG. 4 are not intended to limit the disclosed embodiments as the components used to implement the disclosed processes and features may vary. As shown, content customization system 406 may interact with a user device 402 via a network 404. In certain example implementations, the content customization system 406 may include a local network 410, a content generation system 320, a web server 408, and a database 412.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 404 and ultimately communicating with one or more components of the content customization system 406. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the content customization system 406. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The content generation system 320 may include programs (scripts, functions, algorithms) to configure data for visualizations and provide visualizations of datasets and data models on the user device 402. This may include programs to generate graphs and display graphs. The content generation system 320 may include programs to generate histograms, scatter plots, time series, or the like on the user device 402. The content generation system 320 may also be configured to display properties of data models and data model training results including, for example, architecture, loss functions, cross entropy, activation function values, embedding layer structure and/or outputs, convolution results, node outputs, or the like on the user device 402.

The network 404 may be of any suitable type, including individual connections via the internet such as cellular or WiFi™ networks. In some embodiments, the network 404 may connect terminals, services, and mobile devices using direct connections such as RFID, NFC, Bluetooth™, BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 404 may include any type of computer networking arrangement used to exchange data. For example, the network 404 may be the Internet, a private data network, virtual private network (VPN) using a public network, and/or other suitable connection(s) that enable(s) components in the system 400 environment to send and receive information between the components of the system 400. The network 404 may also include a PSTN and/or a wireless network.

The content customization system 406 may be associated with and optionally controlled by one or more entities such as a business, corporation, individual, partnership, or any other entity that provides one or more of goods, services, and consultations to individuals such as customers. In some embodiments, the content customization system 406 may be controlled by a third party on behalf of another business, corporation, individual, partnership. The content customization system 406 may include one or more servers and computer systems for performing one or more functions associated with products and/or services that the organization provides.

Web server 408 may include a computer system configured to generate and provide one or more websites accessible to customers, as well as any other individuals involved in access system 408's normal operations. Web server 408 may include a computer system configured to receive communications from user device 402 via for example, a mobile application, a chat program, an instant messaging program, a voice-to-text program, an SMS message, email, or any other type or format of written or electronic communication. Web server 408 may have one or more processors 414 and one or more web server databases 416, which may be any suitable repository of website data. Information stored in web server 408 may be accessed (e.g., retrieved, updated, and added to) via local network 410 and/or network 404 by one or more devices or systems of system 400. In some embodiments, web server 408 may host websites or applications that may be accessed by the user device 402. For example, web server 408 may host a financial service provider website that a user device may access by providing an attempted login that are authenticated by the content generation system 320. According to some embodiments, web server 408 may include software tools, similar to those described with respect to user device 402 above, that may allow web server 408 to obtain network identification data from user device 402. The web server may also be hosted by an online provider of website hosting, networking, cloud, or backup services, such as Microsoft Azure™ or Amazon Web Services™.

The local network 410 may include any type of computer networking arrangement used to exchange data in a localized area, such as WiFi™, Bluetooth™, Ethernet, and other suitable network connections that enable components of the content customization system 406 to interact with one another and to connect to the network 404 for interacting with components in the system 400 environment. In some embodiments, the local network 410 may include an interface for communicating with or linking to the network 404. In other embodiments, certain components of the content customization system 406 may communicate via the network 404, without a separate local network 410.

The content customization system 406 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access content customization system 406 using the cloud computing environment. User device 402 may be able to access content customization system 408 using specialized software. The cloud computing environment may eliminate the need to install specialized software on user device 402.

In accordance with certain example implementations of the disclosed technology, the content customization system 406 may include one or more computer systems configured to compile data from a plurality of sources the content generation system 320, web server 408, and/or the database 412. The content generation system 320 may correlate compiled data, analyze the compiled data, arrange the compiled data, generate derived data based on the compiled data, and store the compiled and derived data in a database such as the database 412. According to some embodiments, the database 412 may be a database associated with an organization and/or a related entity that stores a variety of information relating to customers, transactions, ATM, and business operations. The database 412 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

EXAMPLE USE CASE

The following example use case describes an example of a typical user flow pattern. This section is intended solely for explanatory purposes and not in limitation.

In one example, a system may be configured to select a first set of features to display to a user via a GUI, such as on a webpage. The features may include a header, a footer, several links (e.g., to videos, articles, etc.), and other interactive features (e.g., click buttons) associated with certain user inputs. The system may transmit these features for display via a GUI of a user device associated with a first user, e.g., a customer of an entity responsible for operating the system. The entity may receive data corresponding to the first user, such as account or profile information retrieved from within the first user's customer account(s) associated with the entity. The system may be configured to receive the data, and use an encoder (e.g., a neural network) to encode the user data by inserting it into latent space. The latent space may now contain not only compressed data corresponding to the first user, but also other compressed data corresponding to other users that share one or more characteristics with the first user, e.g., age range, profession, geographic location, etc.

The system may then utilize a generative decoder to evaluate the data contained with the latent space and generate a second set of features that the system predicts may be more tailored toward the first user than was the first set of features. That is, the system may be configured to learn something about the user's preferences, interests, etc. based on the latent space data, to then generate a set of new features tailored to the first user. The system may then transmit the new features for display via the GUI such that the first user may begin to visualize and interact with the new features displayed on the webpage.

As the first user interacts with the second features, the system may be configured to receive user feedback, such as webpage activity, click data, selections of user input objects displayed via the webpage, and the like. The system may determine whether the user feedback exceeds one or more predetermined thresholds, such as cursor movement, number of selections of user input objects (e.g., clicking on links, buttons, etc.), overall webpage activity, etc., over a certain period of time. If the system determines the user feedback does not exceed the predetermined threshold, the system may begin the above process over again. That is, the system may receive new or additional data corresponding to the first user, encode that new user data in the latent space, and generate a new set of features that may be even more tailored to the first user than was the second set of features. If the system determines the user feedback does exceed the predetermined threshold, the system may be configured to leave the latest version of the webpage, containing the latest generated set of features, for display to the first user. The system may thus predict that the latest version of the webpage is sufficiently tailored toward or customized for the first user.

In some examples, disclosed systems or methods may involve one or more of the following clauses:

Clause 1: A system, comprising: one or more processors; and a memory in communication with the one or more processors and storing instructions that, when executed by the one or more processors, are configured to cause the system to: generate a first webpage comprising one or more first features; transmit the first webpage for display via a graphical user interface (GUI) of a user device; and iteratively, until a predetermined threshold is achieved: receive data corresponding to a first user; generate, by an encoder, encoded data based on the data; generate, by a decoder, one or more second features based on the encoded data; modify the first webpage to generate a second webpage comprising the one or more second features; transmit the second webpage for display via the GUI of the user device; receive user feedback associated with the second webpage; and determine whether the user feedback exceeds the predetermined threshold; and responsive to the predetermined threshold being achieved, transmit the latest version of the second webpage without requesting additional user feedback.

Clause 2: The system of clause 1, wherein the first features and the second features comprise one or more of text, an image, a video, a layout, a font, a header, a footer, a color, a shape, or combinations thereof.

Clause 3: The system of clause 1, wherein the data comprises one or more of webpage activity, account information, profile information, or combinations thereof.

Clause 4: The system of clause 1, wherein the encoder comprises a neural network.

Clause 5: The system of clause 1, wherein the decoder comprises one or more of a Generative Adversarial Network (GAN), a Generative Pre-trained Transformer 3 (GPT-3), a Multilayer perceptron (MLP), or combinations thereof.

Clause 6: The system of clause 1, wherein the user feedback comprises one or more of click data, a selection of a user input object, a response to a prompt, a survey, or combinations thereof.

Clause 7: A system, comprising: one or more processors; and a memory in communication with the one or more processors and storing instructions that, when executed by the one or more processors, are configured to cause the system to: generate a first webpage comprising one or more first features; transmit the first webpage for display via a graphical user interface (GUI) of a user device; receive data corresponding to a first user; generate, by an encoder, encoded data based on the data; generate, by a decoder, one or more second features based on the encoded data; modify the first webpage to generate a second webpage comprising the one or more second features; and transmit the second webpage for display via the GUI of the user device.

Clause 8: The system of clause 7, wherein the instructions are further configured to cause the system to: receive user feedback associated with the second webpage; and determine whether the user feedback exceeds a predetermined threshold.

Clause 9: The system of clause 8, wherein the instructions are further configured to cause the system to: responsive to determining the user feedback does not exceed the predetermined threshold: receive second data corresponding to the first user; generate, by the encoder, second encoded data based on the second data; generate, by the decoder, one or more third features based on the second encoded data; modify the second webpage to generate a third webpage comprising the one or more third features; and transmit the third webpage for display via the GUI of the user device.

Clause 10: The system of clause 8, wherein the instructions are further configured to cause the system to: responsive to determining the user feedback exceeds the predetermined threshold, maintain the second webpage for display via the GUI of the user device.

Clause 11: The system of clause 8, wherein the user feedback comprises one or more of click data, a selection of a user input object, a response to a prompt, a survey, or combinations thereof.

Clause 12: The system of clause 7, wherein the first features and the second features comprise one or more of text, an image, a video, a layout, a font, a header, a footer, a color, a shape, or combinations thereof.

Clause 13: The system of clause 7, wherein the data comprises one or more of webpage activity, account information, profile information, or combinations thereof.

Clause 14: The system of clause 7, wherein: the encoder comprises a neural network; and the decoder comprises one or more of a Generative Adversarial Network (GAN), a Generative Pre-trained Transformer 3 (GPT-3), a Multilayer perceptron (MLP), or combinations thereof.

Clause 15: A system, comprising: one or more processors; and a memory in communication with the one or more processors and storing instructions that, when executed by the one or more processors, are configured to cause the system to: iteratively, until a predetermined threshold is achieved: select first content; transmit the first content for display via a graphical user interface (GUI) of a user device; receive data corresponding to a first user; generate, by an encoder, encoded data based on the data; generate, by a decoder, second content based on the encoded data; transmit the second content for display via the GUI of the user device; receive user feedback associated with the second content; select third content based on the user feedback; and determine whether selecting the third content satisfies the predetermined threshold; and responsive to determining that selecting the third content satisfies the predetermined threshold, maintain the third content for display via the GUI of the user device.

Clause 16: The system of clause 15, wherein the first, second, and third content comprise one or more of text, an image, a video, a layout, a font, a header, a footer, a color, a shape, or combinations thereof.

Clause 17: The system of clause 15, wherein the user feedback comprises one or more of click data, a selection of a user input object, a response to a prompt, a survey, or combinations thereof.

Clause 18: The system of clause 15, wherein selecting the third content is performed by a multi-armed bandit.

Clause 19: The system of clause 15, wherein determining whether selecting the third content satisfies the predetermined threshold is based on whether the third content comprises old or new content.

Clause 20: The system of clause 15, wherein: the encoder comprises a neural network; and the decoder comprises one or more of a Generative Adversarial Network (GAN), a Generative Pre-trained Transformer 3 (GPT-3), a Multilayer perceptron (MLP), or combinations thereof.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description.

References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   one or more processors; and
   a non-transitory memory in communication with the one or more processors and storing instructions that, when executed by the one or more processors, are configured to cause the system to:
   generate a first webpage comprising one or more first features;
   transmit the first webpage for display via a graphical user interface (GUI) of a user device; and
   iteratively, until a predetermined threshold is achieved:
   receive data corresponding to a first user;
   generate, by an encoder, encoded data based on the data, wherein the encoded data is inserted into a latent space comprising previously encoded data corresponding to other users that share at least one characteristic with the first user;
   generate, by a decoder, one or more second features based on the encoded data and the latent space, wherein the one or more second features comprise a prediction of features that are tailored to the first user;
   modify the first webpage to generate a second webpage comprising the one or more second features;
   transmit the second webpage for display via the GUI of the user device;
   receive user feedback associated with the second webpage; and
   determine whether the user feedback exceeds the predetermined threshold; and
   responsive to the predetermined threshold being achieved, transmit the latest version of the second webpage without requesting additional user feedback.

2. The system of claim 1, wherein the first features and the second features comprise one or more of text, an image, a video, a layout, a font, a header, a footer, a color, a shape, or combinations thereof.

3. The system of claim 1, wherein the data comprises one or more of webpage activity, account information, profile information, or combinations thereof.

4. The system of claim 1, wherein the encoder comprises a neural network.

5. The system of claim 1, wherein the decoder comprises one or more of a Generative Adversarial Network (GAN), a Generative Pre-trained Transformer 3 (GPT-3), a Multilayer perceptron (MLP), or combinations thereof.

6. The system of claim 1, wherein the user feedback comprises one or more of click data, a selection of a user input object, a response to a prompt, a survey, or combinations thereof.

7. A system, comprising:
   one or more processors; and
   a non-transitory memory in communication with the one or more processors and storing instructions that, when executed by the one or more processors, are configured to cause the system to:
   generate a first webpage comprising one or more first features;

transmit the first webpage for display via a graphical user interface (GUI) of a user device;
receive data corresponding to a first user;
generate, by an encoder, encoded data based on the data, wherein the encoded data is inserted into a latent space comprising previously encoded data corresponding to other users that share at least one characteristic with the first user;
generate, by a decoder, one or more second features based on the encoded data and the latent space, wherein the one or more second features comprise a prediction of features that are tailored to the first user;
modify the first webpage to generate a second webpage comprising the one or more second features; and
transmit the second webpage for display via the GUI of the user device.

8. The system of claim 7, wherein the instructions are further configured to cause the system to:
receive user feedback associated with the second webpage; and
determine whether the user feedback exceeds a predetermined threshold.

9. The system of claim 8, wherein the instructions are further configured to cause the system to:
responsive to determining the user feedback does not exceed the predetermined threshold:
receive second data corresponding to the first user;
generate, by the encoder, second encoded data based on the second data;
generate, by the decoder, one or more third features based on the second encoded data;
modify the second webpage to generate a third webpage comprising the one or more third features; and
transmit the third webpage for display via the GUI of the user device.

10. The system of claim 8, wherein the instructions are further configured to cause the system to:
responsive to determining the user feedback exceeds the predetermined threshold, maintain the second webpage for display via the GUI of the user device.

11. The system of claim 8, wherein the user feedback comprises one or more of click data, a selection of a user input object, a response to a prompt, a survey, or combinations thereof.

12. The system of claim 7, wherein the first features and the second features comprise one or more of text, an image, a video, a layout, a font, a header, a footer, a color, a shape, or combinations thereof.

13. The system of claim 7, wherein the data comprises one or more of webpage activity, account information, profile information, or combinations thereof.

14. The system of claim 7, wherein:
the encoder comprises a neural network; and
the decoder comprises one or more of a Generative Adversarial Network (GAN), a Generative Pre-trained Transformer 3 (GPT-3), a Multilayer perceptron (MLP), or combinations thereof.

15. A system, comprising:
one or more processors; and
a non-transitory memory in communication with the one or more processors and storing instructions that, when executed by the one or more processors, are configured to cause the system to:
iteratively, until a predetermined threshold is achieved:
select first content;
transmit the first content for display via a graphical user interface (GUI) of a user device;
receive data corresponding to a first user;
generate, by an encoder, encoded data based on the data, wherein the encoded data is inserted into a latent space comprising previously encoded data corresponding to other users that share at least one characteristic with the first user;
generate, by a decoder, second content based on the encoded data and the latent space, wherein the second content comprises a prediction of content that is tailored to the first user;
transmit the second content for display via the GUI of the user device;
receive user feedback associated with the second content;
select third content based on the user feedback; and
determine whether selecting the third content satisfies the predetermined threshold; and
responsive to determining that selecting the third content satisfies the predetermined threshold, maintain the third content for display via the GUI of the user device.

16. The system of claim 15, wherein the first, second, and third content comprise one or more of text, an image, a video, a layout, a font, a header, a footer, a color, a shape, or combinations thereof.

17. The system of claim 15, wherein the user feedback comprises one or more of click data, a selection of a user input object, a response to a prompt, a survey, or combinations thereof.

18. The system of claim 15, wherein selecting the third content is performed by a multi-armed bandit.

19. The system of claim 15, wherein determining whether selecting the third content satisfies the predetermined threshold is based on whether the third content comprises old or new content.

20. The system of claim 15, wherein:
the encoder comprises a neural network; and
the decoder comprises one or more of a Generative Adversarial Network (GAN), a Generative Pre-trained Transformer 3 (GPT-3), a Multilayer perceptron (MLP), or combinations thereof.

* * * * *